May 30, 1950 L. S. CRAIG ET AL 2,509,215

RADIOSONDE

Filed Sept. 6, 1944

INVENTORS.
LEO S. CRAIG
LEON HILLMAN
BY William D. Hall
ATTORNEY

Patented May 30, 1950

2,509,215

UNITED STATES PATENT OFFICE 2,509,215

RADIOSONDE

Leo S. Craig, Eatontown, N. J., and Leon Hillman, New York, N. Y., assignors to the United States of America as represented by the Secretary of War Application September 6, 1944, Serial No. 552,854

1 Claim. (Cl. 177—380)

Figures 1, 2:
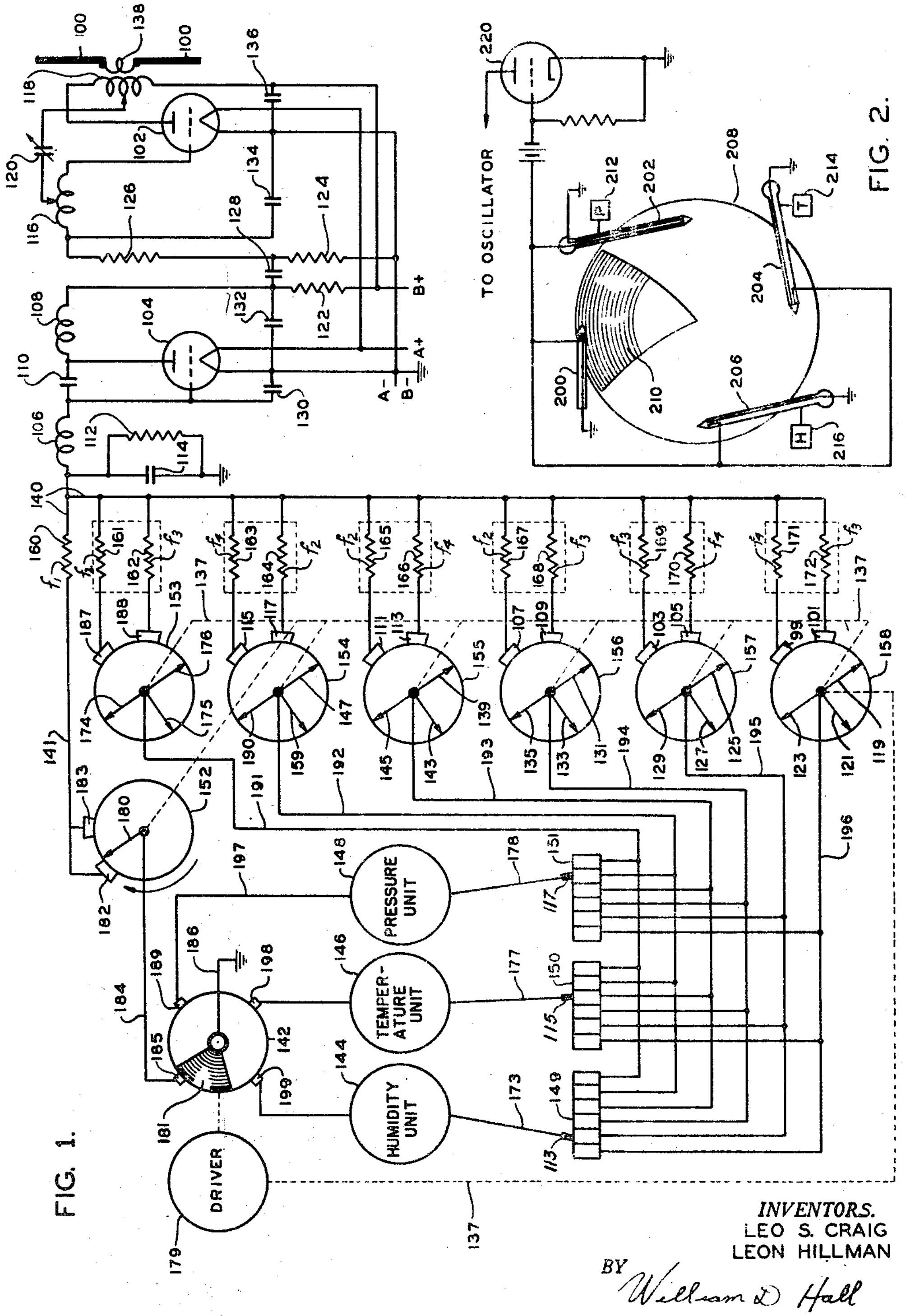

(Granted under the act of March 3, 1883, as amended April 30, 1928; 370 O. G. 757)

The invention described herein may be manufactured and used by or for the Government for governmental purposes, without the payment to us of any royalty thereon.

This invention relates to meterological apparatus and more particularly to radiosondes suitable for being carried aloft by a free balloon. During its flight the radiosonde transmits radio signals, which, when properly interpreted, give essentially continuous record of pressure, temperature and humidity of the atmosphere through which it passes.

The temperature, humidity and pressure data is automatically transmitted by means of a modulated carrier, the modulation being performed by a predetermined number and sequence of audio frequencies, the sequence of the audio fraquencies determining the reading of the instruments.

In the prior art it has been customary to send the meteorological data either by means of Morse code signals or by means of a variable audio frequency, the frequency being varied in a continuous manner. The Morse code transmitters, as a rule, require expensive apparatus at the radiosonde, and either good knowledge of the Morse code by the monitoring operators or an expensive teletype equipment for recording the Morse code messages. The continuous audio frequency method of transmitting instrument readings requires a rather involved and bulky receiving equipment thus again complicating the installation used for obtaining the meteorological data.

According to the first embodiment of the invention, illustrated in Fig. 1, simplification of the meteorological data-collecting system is accomplished by resorting to the use of a limited number of audio frequencies for modulating the radiosonde transmitter. The frequencies are arranged in coded combinations, sufficient number of combinations being provided for obtaining the desired range of readings for all instruments. According to the first embodiment of the invention, the radio frequency of the radiosonde transmitter is modulated by a self-blocking u. h. f. oscillator the blocking frequency of which is controlled by varying the resistance in the blocking circuit of the oscillator. The resistance is varied in steps, each step transmitting a predetermined audio frequency, the audio frequency being produced by the rate of blocking of the self-blocking U. H. F. oscillator. Sufficient frequency difference is used between the steps so that the monitoring operator, who receives the signals over a head-set or a loud speaker, may recognize the particular frequency transmitted without any special difficulty, and is in a position to differentiate it from other frequencies used for transmitting the frequency-coded instrument readings. The selection of resistances is performed by meteorological instruments, the moving elements of which operate over the commutators, thus interposing suitable resistances in the circuit of the audio oscillator.

According to the first embodiment of the invention the radiosonde, therefore, consists of a battery-energized radio transmitter designed to be carried aloft by a free balloon, and a plurality of meteorologically sensitive instruments which introduce different resistances into the circuit of the self-blocking U. H. F. oscillator-modulator connected to the radio transmitter, the modulator keying the ultra-high frequency of the transmitter by the interrupted U. H. F. of the modulator, the interrupting rate of the first U. H. F. being used for determining the readings of the meteorological instruments also carried aloft by the same free balloon.

The advantages of the first system reside in a relatively simple radiosonde transmitter, and what is especially important, simplification of the receiving equipment, which in its simplest form, reduces to an ordinary super-heterodyne receiver with the head phones connected to the output of the receiver.

Another important advantage resides in the fact that the monitoring operators may be trained very readily to record the received data, and need not be trained to record Morse code messages. Interpretation of the Morse code messages is obviously more difficult for an untrained operator than interpretation of a limited number of audio frequency combinations which are used by the invention to accomplish the same purpose.

According to the second embodiment of the invention, illustrated in Fig. 2, a phonograph disc is used for transmitting the signals from the radiosonde, the disc being provided with four reproducing arms one arm being a reference arm and the remaining three arms being the arms which are operated by the meteorological instruments. The disc is also provided with a sector which bears upon it the combinations of the recorded audio frequencies which correspond to the audio frequencies of Fig. 1. The angular position of the reproducing arms with respect to the recorded sector of the disc is controlled by the meteorological instruments and, therefore, the reproducers transmit different frequency combinations, the transmitted combinations depending upon the readings of the instruments.

It is, therefore, the principal object of this invention to provide a radiosonde transmitting equipment which transmits meteorological data by means of a radio carrier modulated by means of a plurality of audio frequencies, the audio frequencies being arranged in different permutations to indicate the position of meteorologically sensitive instruments.

Another object of this invention is to provide a radiosonde the modulating U. H. F. oscillator of which comprises a self-blocking oscillator whose blocking frequency may be controlled by means of variable resistances which are selected by the meteorological instruments. The meteorological instruments, therefore, control the blocking frequency of the modulator.

Still another object of this invention is to provide a radiosonde the meteorological instruments of which control the angular positions of the reproducing arms which are in reproducing engagement with a disc. One sector of said disc has a plurality of audio frequency combinations recorded upon it, the reproduced frequencies being used for determining the readings of the meteorological instruments.

The novel features which we believe to be characteristic of our invention are set forth with particularity in the appended claims, our invention itself, however, both as to its organization and method of operation, together with the further objects and advantages thereof, may best be understood by reference to the following description in connection with the accompanying drawings in which:

Figure 1 is a schematic diagram of the first type of the radiosonde transmitter, and Figure 2 is a schematic diagram of the second type of the radiosonde transmitter.

Before proceeding with a more detailed description of the schematic diagram shown in Fig. 1, it may be helpful to outline briefly the general principles of operation of the device. The invention is illustrated in connection with three meteorological instruments 144, 146 and 148 which are responsive to humidity, temperature and pressure respectively of the atmosphere surrounding them. Since all of these instruments are coupled to a single transmitter-modulator combination 102—104, it is necessary to provide some automatic switching arrangement for connecting these instruments in a predetermined sequence. This is accomplished by a rotating instrument-selecting switch 142 provided with a conducting sector 181 and four conducting segments 185, 189, 198 and 199. Segments 189, 198 and 199 connect the meteorological instruments to the transmitter and segment 185 connects the transmitter to an auxiliary rotating switch 152 which is used for indicating the angular position of the rotating switches 153 through 158. By knowing the angular position of the rotating switches 153 through 158, the operator is in a position to judge which particular instrument is transmitting the signals at any given time, all rotating switches being rigidly connected through a single driving shaft to a clock or gravity type driving mechanism 179. Thus the operating cycle of the switches is as follows: it begins with the sending of a predetermined audio frequency $f_1$ to indicate the angular position of all switches, and it is then followed by the transmission of signals by the instruments. All switches are provided with two conducting segments, 182—183, 187—188, 115—117, 111—113, 107—109, 103—105, 99—101, so that the transmitted messages consist of two audio signals interrupted by a silence. The meteorological instruments operate electrically conductive lever arms 173, 177, and 178 which connect these arms through brushes 113, 115, 117 and through commutators 149, 150, 151 to one of the six rotating switches 153 through 158. Depending upon the position of these arms on the commutators 149, 150, 151, certain audio frequency combinations are transmitted by the radiosonde, the values of the transmitted frequencies being determined by the values of the resistances 161 through 172 connected in series with the switches 153 through 158. These rotating switches are provided with the rotating arms 174, 175, 176, 147, 159, 190, 139, 143, 145, 131, 133, 135, 125, 127, 129, 119, 121, 123, the number of the rotating arms on each switch corresponding to the number of the instruments used in the radio sonde. These rotating arms are 90° apart on each switch, corresponding to the 90° separation of segments 189, 198, 199 of switch 142, thus ensuring that each of switches 153 to 158 is ready to conduct whenever segment 181 touches conducting segment 189, 198, or 199 of switch 142. Which of the six switches will conduct will of course further depend upon the commutator segment that brushes 113, 115, or 117 happen to be touching at any given moment. Thus during one complete revolution of the switches the transmitter sends signals which begin with the signal identifying the angular position of the switches, and this is followed by three signals transmitted by the three instruments, each instrument signal consisting of two different audio frequencies. These audio frequencies are used for identifying the instrument readings on the radiosonde. The functioning of the modulator-transmitter combination will be described first, and it will be then followed with the description of connections between the meteorological instruments and the modulator.

Proceeding now with a more detailed description of the schematic diagram, an antenna 100 is connected to an ultra-high frequency carrier oscillator 102, the grid of which is connected to a trigger type modulating oscillator 104. The frequency of the keying circuit is determined by the parameters of the grid coil 106, the plate coil 108 and the tuning capacitor 110. The oscillating frequency of this oscillator may be in the order of one megacycle per second. The oscillation is intermittent, being controlled by the resistance-capacitance circuit 112—114, and the additional resistances 160 through 172 which are periodically connected in parallel with the resistance 112 by the meteorologically sensitive instruments 144, 146, 148 and the rotating switches 152 through 158. The audio frequency that is heard by the monitoring operator at the receiver is determined by the frequency with which the oscillator 104 is triggered "on" and "off." The transmitter thus represents a well known double modulation transmitter. During the oscillating condition of triode 104, the grid takes the positive charge at half cycles causing a current to flow through resistance 112, and one of the additional resistances paralleling resistance 112 at various times. The voltage developed across the condenser-resistance network is applied as a negative biasing voltage to the grid of triode 104. The magnitude of this biasing voltage is a function of the charging rate of condenser 114 through the grid-filament resistance of tube 104; the voltage finally builds up to a sufficient value to block the oscillator. During the non-oscillating condition the capacitor 114 discharges through the two parallel resistances until negative biasing voltage is again sufficiently low to allow the tube to oscillate. This action is repeated cyclically at an audio frequency rate. The duration of the oscillating period is a function of the capacitor 114 and the tube parameters, while the duration of the non-oscillating period is controlled by the capacitor 114 and the resistance network shunting this capacitance. The latter, as mentioned previously, is composed of fixed resistance 112 and of a plurality of fixed resistances, 160 through 172, one of which is placed during the operating cycle in parallel with resistance 112 by the meteorological instruments. Hence by varying the value of the resistance network, as is done by the meteorological instruments, it is possible to vary the duration of the non-oscillating period of triode 104; i. e., the frequency at which the short oscillating pulses occur. As mentioned previously, it is the frequency of the short oscillating pulses that actually produces the audio signals at the receiver.

The ultra-high frequency oscillator 102 operates at a frequency which may be in the order of 100 megacycles. The frequency of the oscillation is controlled by the grid coil 116, the plate coil 118, and the grid-plate capacitance of the triode in parallel with the effective capacitance between the leads of the condenser 120. The oscillations of this oscillator are also intermittent, being on when the modulating oscillator is off, and off when the latter is on. This action takes place as follows: when the modulating oscillator is in an oscillating condition the plate of triode 104 draws current and a negative direct current voltage appears across the resistor 122 connected in its plate supply circuit. This voltage is applied across the portion 124 of the grid circuit resistor 126, 124 of the carrier oscillator triode 102 through the coupling capacitor 128. The constants of the circuit are adjusted so that this voltage is of sufficient magnitude to block the carrier oscillator 102, the oscillations beginning again when the modulating oscillator 104 becomes non-oscillating and the voltage across the biasing resistor 122 collapses. Capacitor 130 is a stabilizing capacitor for the modulating oscillator and condensers 132, 134 and 136 are audio frequency by-pass condensers. Resistor 126 is a stabilizing resistor for the carrier oscillator. The output of the carrier oscillator is coupled inductively to the half-wave vertical antenna 100 by means of a loop 138 at the center of the antenna.

From the foregoing description it will be evident that the U. H. F. oscillator 102 is modulated by oscillator 104 at the frequency of oscillator 104 and the carrier wave sent out by the transmitter is a double modulation wave interrupted completely for short periods of time, the value of the resistance inserted by the meteorograph instruments controlling the rate of these interruptions.

The roles played by resistor 112 and the resistances 160 through 172 inserted by the meteorograph instruments is as follows: if the resistance introduced by the meteorographs is infinite, resistance 112 alone forms the controlling resistance of the oscillator 104. If the resistance connected by the instruments is lower than infinity, the audio frequency interruptions will be determined by the equivalent resistance equal to resistor 112 paralleled by the instrument resistor. Thus a number of audio frequencies may be generated by merely changing the resistance paralleling the resistance 112. The value of resistance 112 is preferably such that, with only resistance 112 in the circuit, the modulating frequency is in the order of a few cycles per second so that it does not produce any audible signals at the receiver. The advisability of having resistors 112 in the circuit is obvious. It acts as a stabilizing and biasing resistor in the circuit of the oscillator 104, thus avoiding floating grid conditions, transients and severe loads that may be otherwise imposed occasionally on the power supply and the current carrying capacity of triode 104.

Referring now to the apparatus for connecting the resistances 160 through 172 in shunt with resistance 112. The shunting connection is accomplished over conductors 140, 141, the resistors 160 through 172, the switches 152 through 158, the commutators 149, 150, 151, the conductive arms 173, 177, 178, the instruments 144, 146, 148, and the instrument selector switch 142. The resistors 160 through 172 are the shunting resistances which determine the audio frequency transmitted by the U. H. F. transmitter 102. The audio frequencies produced by the resistors are also designated in the drawing directly over the resistors as frequencies $f_1$ through $f_4$ signify the fact that $f_1$ is used for designating angular position of the switches and that $f_2$ through $f_4$ are used in different permutations to designate the readings of the instruments.

As mentioned previously, each of the switches 153 through 158 consist of three rotating arms, such as 174, 175, and 176, which are all mounted on the same shaft indicated by a dotted line 137, connecting the common shaft of the rotating arms to the driving mechanism 179 which rotates them, the arm 180 of the rotating switch 152, and the instrument selecting sector 181 of the instrument selector 142 at uniform angular velocity.

The instrument selector sector 181 and the switch arms 180, 174, 175, 176, etc. are illustrated in the drawing in their normal starting position. Therefore, at this instant, conductor 140 connects the audio frequency oscillator 104 to a resistance 160 which is connected on one side to ground through a conductor 141, segment 182, switch arm 180, conductor 184, segment 185, sector 181, the shaft of sector 181, and a grounded conductor 186. Because of this circuit the blocking audio frequency of the oscillator 104 is determined at this instant by the resistance 160 connected in parallel with resistance 112. A predetermined audio frequency $f_1$ is generated by the oscillator 104, and since this is the starting position of the system, the appearance of this frequency at the receiver immediately notifies the monitoring operator of the position of all rotating switches as well as of the position of the rotating sector 181. For the sake of clarity of the disclosure specific angles will be assigned to some of the elements of the system but it will be obvious to those skilled in the art that the quoted angles may be different, and the invention is not limited to the specific values given in the specification. Thus the instrument selecting sector may span a 75° angle, and the conducting segments 182, 183, 187, 188, etc. may each span an angle of 20° separated by an angle of 30°. Thus there is an angle of 70° between the leading edge of the segments and the lagging edge of the second segment, such angular arrangement of the segments insuring completion of the electrical circuit at the switches 152 through 158. The conducting segments 185, 189, 198 and 199 of switch 142 are 10° each, thus leaving a 5° clearance between them to avoid their shorting by sector 181.

From the given description it follows that the oscillator 104 will generate blocking frequency $f_1$ as long as arm 180 makes contact with either segment 182 or 183, and the eight cycle frequency when only the resistance 112 shunts condenser 114, the latter frequency being inaudible at the receiver. This signal notifies the monitoring operator that the instrument selecting segment 181 is leaving segment 185 and is on its way toward the conducting segment 189 if a clockwise rotation of the elements, indicated in the figure, is assumed. The operator will thus know that the next signals will be those indicating the reading of the aneroid 148. The latter consists of one or more evacuated aneroid capsules, whose expansion or contraction is multiplied by an appropriate level system into a linear or angular motion and it is this angular motion that is utilized for changing the position of the conducting arm 178 on the commutator 151.

As illustrated in the figure, the number of the commutator segments on the commutator 151 is equal to the number of the rotating switches 153 through 159, this latter number being equal to six. Each commutator segment is connected by means of its conductor, conductors 191 through 196, to its respective switch. Therefore, when the aneroid operated arm 178 is, for example, on the extreme right segment, it connects conductor 191 to the upper switch 153, and segment 187 which is reached by the rotating arm 174 approximately at the same time as sector 181 of the instrument selecting switch 142 reaches segment 189. That this is actually the case may be perceived from the examination of the drawing where arm 174 is illustrated as lagging by 2.5° the leading edge of the sector 181. Thus resistor 161 will control the blocking frequency of the oscillator 104 at this instant, the circuit being conductor 140, resistor 161, segment 187, arm 174, conductor 191, commutator 151, brush 117, aneroid arm 178, conductor 197, segment 189, sector 181, and grounded conductor 186. Identical circuits will exist when arm 174 reaches segment 188 with the resistance 162 shunting resistance 112 and frequency $f_3$ appearing at this instant. This notifies the monitoring operator that the aneroid arm 178 is on the extreme right segment of the commutator 151. Previous calibration of the aneroid immediately establishes at the receiver the pressure to which the aneroid bellows are subjected at this instant. This cycle repeats itself in connection with the temperature unit 146 and humidity unit 144, when the instrument selecting sector 181 makes contact first with the conducting segment 198 and then segment 199.

The operation of the temperature and humidity units 146 and 144 from the point of view of the electrical transmission of their positions is obviously identical to the electrical transmission of the position of the aneroid, and, therefore needs no additional description. Suffice it to say that upon the instrument selecting sector 181 leaving conducting segment 189, there will be again an interval of time when the modulating oscillator 104 will key the U. H. F. transmitter 102 at a low blocking frequency of 8 cycles, thus interposing a period of silence at the receiver. This period of silence immediately notifies the monitoring operator that the instrument selector has left the aneroid instrument and is on its way to the temperature indicator. The same type of silence cycle is used for notifying the monitoring operator that the instrument selecting segment has left the conducting segment 198 and is on its way to the humidity indicator 144.

Figure 2 discloses another suitable arrangement for accomplishing the results outlined in connection with Fig. 1. In Fig. 2, four reproducing arms 200 through 206 are placed over a disc 208 which is rotated at a uniform speed by means of a mechanical or electrical drive. The disc has a sector 210 which is slightly elevated above the remaining portion of the disc so that the reproducing arms are normally suspended from the pivot points and are not making any contacts with the disc except when they come in contact with the elevated segment 210 of the disc. The segment has a plurality of recorded audio frequency permutations, the recordings being made in such a manner that one frequency is transmitted first, and, after a period of silence, the other frequency. These frequency permutations are used in the same manner as those previously mentioned in connection with Fig. 1. The arms 202, 204 and 206 are connected to the pressure, temperature, and humidity elements 212, 214 and 216 respectively, these elements determining the angular positions of the reproducing arms with respect to the recorded sector of the disc. Accordingly, depending upon the readings of the meteorological instruments, the reproducing arms engage different portions of the sector and transmit different frequency permutations the latter identifying the instrument readings with the aid of the calibration charts. Arm 200 is used for notifying the monitoring operator of the sequence of rotation of the arms so that he could be apprised which particular arm is transmitting the signal at any given time. The arm 200, therefore, accomplishes the same function as the rotating switch 152 in Fig. 1. The output signals of the reproducing arms are impressed on the control grid of the amplifier 220, and the output of the latter may be used in any desired manner for modulating the U. H. F. oscillator. Either a single or double modulation principle of transmission may be used in a well known manner, such as that described in Fig. 1.

The advantage of the arrangement illustrated in Fig. 2, resides in the fact that a larger number of frequency permutations may be used in this arrangement without unduly overburdening the equipment, and the structural features are simpler than those used in Fig. 1.

What is claimed is:

A radiosonde transmitter for transmitting meteorological readings by selective combination of transmission frequencies including a self-blocking oscillator, impedance means for determining the self-blocking frequency of said oscillator, said impedance means including a fixed element and selectively connectable elements shunting said fixed element, said connectable elements comprising a plurality of sets of parallel resistors, each set of parallel resistors being so arranged as to provide a combination of resistors that differs in arrangement from that of any other set, a plurality of rotating switches connected respectively to said sets of parallel resistors; a plurality of commutators connected to each of said switches, each of said commutators having an adjustable arm; a plurality of meteorological instruments, the number of the instruments corresponding to the number of said commutators, mechanical connections between said instruments and the respective commutator arms, whereby the positions of said commutator arms correspond to the respective readings of said instruments, an instrument selecting switch coupled to said sets of parallel resistors, and a driving means connected to said selecting switch and said rotating switches, said selecting and rotating switches being so constructed and arranged that only one meteorological instrument is connected to said oscillator at any given time, whereby the self-blocking frequency of said oscillator is determined by the reading of only one instrument, and a fixed resistance shunting said impedance means once during one revolution of said selecting switch, said fixed resistance identifying the order of connection of said instruments to said oscillator.

LEO S. CRAIG.
LEON HILLMAN.

REFERENCES CITED

The following references are of record in the file of this patent:

UNITED STATES PATENTS

| Number | Name | Date |
|---|---|---|
| 2,216,161 | Curtiss et al. | Oct. 1, 1940 |
| 2,347,160 | Wallace | April 18, 1944 |
| 2,347,345 | Wallace | April 25, 1944 |
| 2,333,248 | Harvey | Nov. 21, 1943 |
| 2,418,836 | Hawes | Apr. 15, 1947 |